United States Patent
Kuwahara

(10) Patent No.: US 10,523,015 B2
(45) Date of Patent: Dec. 31, 2019

(54) POWER GENERATION APPARATUS, POWER GENERATION SYSTEM, AND POWER GENERATION METHOD

(71) Applicant: KYOCERA CORPORATION, Kyoto-Shi, Kyoto (JP)

(72) Inventor: Hitoshi Kuwahara, Daito (JP)

(73) Assignee: KYOCERA Corporation, Kyoto (JP)

(*) Notice: Subject to any disclaimer, the term of this patent is extended or adjusted under 35 U.S.C. 154(b) by 331 days.

(21) Appl. No.: 15/325,411

(22) PCT Filed: Jul. 10, 2015

(86) PCT No.: PCT/JP2015/003506
§ 371 (c)(1),
(2) Date: Jan. 10, 2017

(87) PCT Pub. No.: WO2016/006257
PCT Pub. Date: Jan. 14, 2016

(65) Prior Publication Data
US 2017/0141579 A1    May 18, 2017

(30) Foreign Application Priority Data

Jul. 10, 2014  (JP) ................................ 2014-142749
Jul. 10, 2014  (JP) ................................ 2014-142750

(51) Int. Cl.
*H02J 3/46* (2006.01)
*H02J 3/38* (2006.01)
*H02M 7/42* (2006.01)

(52) U.S. Cl.
CPC ............. *H02J 3/46* (2013.01); *H02J 3/381* (2013.01); *H01M 2250/00* (2013.01); *H02M 7/42* (2013.01)

(58) Field of Classification Search
CPC ....................................................... H02J 3/46
See application file for complete search history.

(56) References Cited

FOREIGN PATENT DOCUMENTS

JP   S54-140943 A   11/1979
JP   2002-70647 A   3/2002
(Continued)

OTHER PUBLICATIONS

Office Action dated Oct. 3, 2017 issued in counterpart Japanese Application No. 2014-142750.
(Continued)

*Primary Examiner* — Daniel J Cavallari
(74) *Attorney, Agent, or Firm* — Procopio Cory Hargreaves and Savitch LLP

(57) ABSTRACT

This power generation apparatus, power generation system, and power generation method advantageously control distributed power sources as a whole. A power generation apparatus includes a power generator that generates power to supply to a load and includes a controller that controls output of power generated by the power generator. The controller controls, when the total output of power generated by the power generation apparatus and other power generation apparatuses connected thereto exceeds the power consumption of the load, to adjust output of power generated by the power generation apparatus and the other power generation apparatuses based on at least one of information indicating the power generation efficiency and information indicating the degree of degradation of the power generation apparatus and the other power generation apparatuses.

11 Claims, 7 Drawing Sheets

(56) References Cited

FOREIGN PATENT DOCUMENTS

| JP | 2003-244852 A | 8/2003 |
|---|---|---|
| JP | 2004-327120 A | 11/2004 |
| JP | 2004-327448 A | 11/2004 |
| JP | 4718133 B2 | 11/2004 |
| JP | 2006-262612 A | 9/2006 |
| JP | 2006262612 A * | 9/2006 |
| JP | 2007-020260 A | 1/2007 |
| JP | 2010-4667 A | 1/2010 |
| JP | 2013-27285 A | 2/2013 |

OTHER PUBLICATIONS

Extended European Search Report dated Feb. 23, 2018, issued by the European Patent Office in counterpart European Patent Application No. 15 818932.4.
Office Action dated Nov. 21, 2017 issued in counterpart Japanese Application No. 2014-142749.
Written Opinion of the International Searching Authority dated Aug. 19, 2015 by the Japanese Patent Office in corresponding PCT International Application No. PCT/JP2015/003506.
International Search Report dated Sep. 1, 2015 by the Japanese Patent Office in corresponding PCT International Application No. PCT/JP2015/003506.

* cited by examiner

FIG. 3

| Total output x | Distributed power source 10A | Distributed power source 10B | Distributed power source 10C |
|---|---|---|---|
| 8.0 kW < x | 3.0 kW | 3.0 kW | x − 6.0 kW |
| 7.0 kW < x ≤ 8.0 kW | 3.0 kW | x − 5.0 kW | 2.0 kW |
| 6.0 kW < x ≤ 7.0 kW | x − 4.0 kW | 2.0 kW | 2.0 kW |
| 4.0 kW < x ≤ 6.0 kW | 2.0 kW | 2.0 kW | x − 4.0 kW |
| 2.0 kW < x ≤ 4.0 kW | 2.0 kW | x − 2.0 kW | 0 kW |
| 0 kW < x ≤ 2.0 kW | x [kW] | 0 kW | 0 kW |

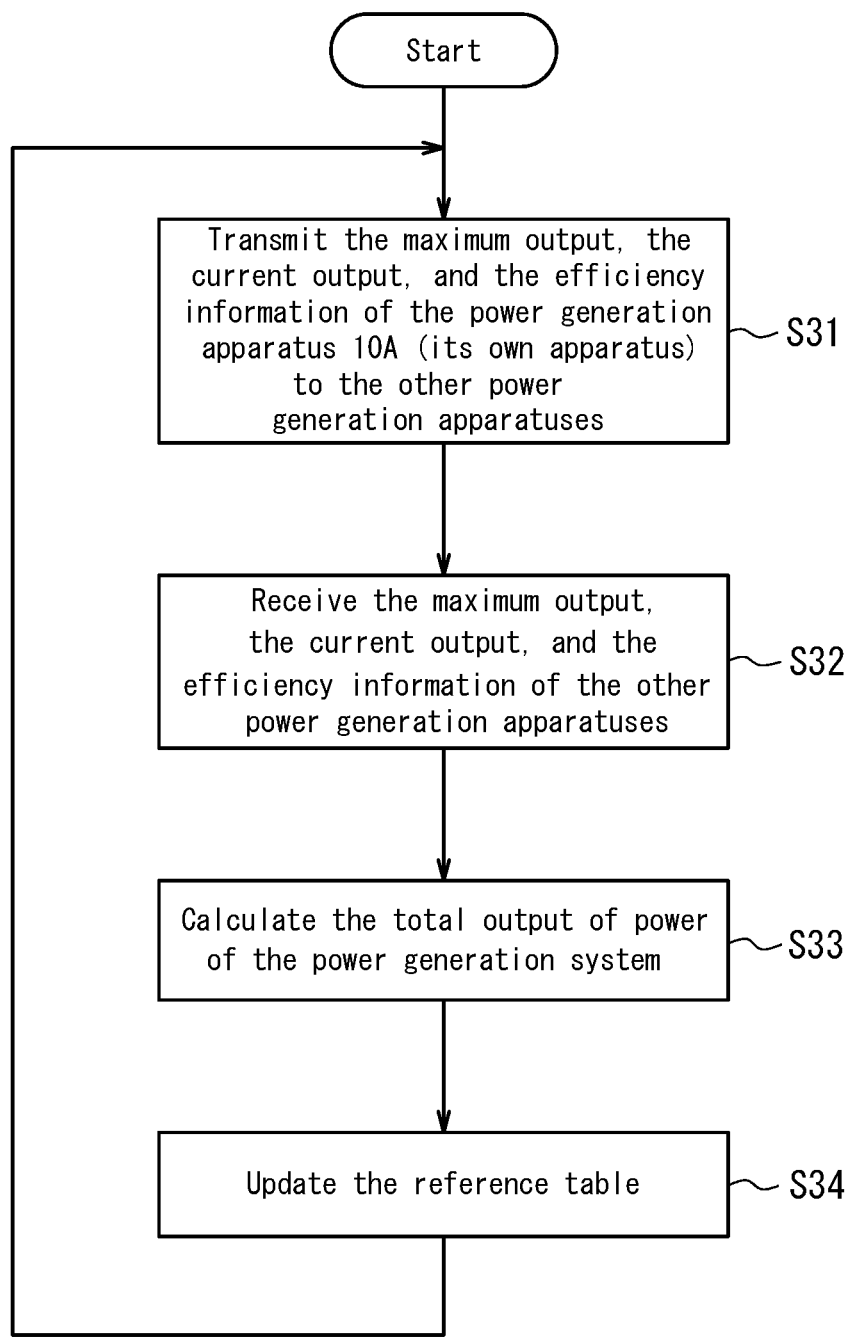

FIG. 7

| Total output x | Distributed power source 10A | Distributed power source 10B | Distributed power source 10C |
|---|---|---|---|
| 6.0 kW < x | 3.0 kW | 3.0 kW | x − 6.0 kW |
| 3.0 kW < x ≤ 6.0 kW | 3.0 kW | x − 3.0kW | 0 kW |
| 0 kW < x ≤ 3.0 kW | x [kW] | 0 kW | 0 kW |

POWER GENERATION APPARATUS, POWER GENERATION SYSTEM, AND POWER GENERATION METHOD

CROSS-REFERENCE TO RELATED APPLICATION

This application claims priority to and the benefit of Japanese Patent Application No. 2014-142749 and Japanese Patent Application No. 2014-142750 filed Jul. 10, 2014, the entire contents of which are incorporated herein by reference.

TECHNICAL FIELD

This disclosure relates to a power generation apparatus, a power generation system, and a power generation method. In greater detail, this disclosure relates to a power generation apparatus, such as a fuel cell, that constitutes a distributed power source, to a power generation system that connects a plurality of such power generation apparatuses, and to a power generation method for such a power generation apparatus or power generation system.

BACKGROUND

In recent years, research has been done on a power generation system that connects a plurality of distributed power sources, such as solar cells and fuel cells, as power generation apparatuses and provides power generated by the power generation apparatuses. The power generation apparatuses used as these distributed power sources for example include fuel cells such as a Polymer Electrolyte Fuel Cell (PEFC) and a Solid Oxide Fuel Cell (SOFC). It has been proposed to adopt a plurality of such distributed power sources and control the power consumption of devices constituting a load in accordance with the power that can be provided by the distributed power sources (for example, see JP 2007-20260 A (PTL 1)).

CITATION LIST

Patent Literature

PTL 1: JP 2007-20260 A

SUMMARY

Technical Problem

Conventionally, when a plurality of distributed power sources are connected and operated, the output of each distributed power source is adjusted. Therefore, the operation of the distributed power sources may be uneven, for example with some of the distributed power sources always producing high output and some constantly suspending output. During such operation, a distributed power source that operates under a high load and hence maintains high output for an extended period of time degrades more quickly and suffers a shorter lifespan. If the lifespan thus becomes shorter for a portion of the distributed power sources, the power generation system that includes the distributed power sources also suffers a shorter lifespan for the system as a whole.

Furthermore, the power generation efficiency of the distributed power sources may become uneven due to some of the distributed power sources having a relatively high power generation efficiency and some having a relatively low power generation efficiency. If the power generation efficiency is thus lower for a portion of the distributed power sources, the power generation system that includes the distributed power sources may also suffer a decreased power generation efficiency for the system as a whole.

Therefore, it would be helpful to provide a power generation apparatus, a power generation system, and a power generation method that advantageously control a plurality of distributed power sources as a whole.

Solution to Problem

A power generation apparatus according to a first aspect of this disclosure includes:
a power generator configured to generate power to supply to a load; and
a controller configured to control output of power generated by the power generator; such that
the controller controls, when a total output of power generated by the power generation apparatus and another power generation apparatus connected to the power generation apparatus exceeds a power consumption of the load, to adjust output of power generated by the power generation apparatus and by the other power generation apparatus based on at least one of information indicating a power generation efficiency and information indicating a degree of degradation of the power generation apparatus and the other power generation apparatus.

A power generation system according to a second aspect of this disclosure includes a plurality of power generation apparatuses capable of controlling output of power supplied to a load; such that
the plurality of power generation apparatuses each control, when a total output of power generated by connecting the plurality of power generation apparatuses exceeds a power consumption of the load, to adjust output of power generated by the power generation apparatus based on at least one of information indicating a power generation efficiency and information indicating a degree of degradation of each of the plurality of power generation apparatuses.

A power generation method according to a third aspect of this disclosure is for a plurality of power generation apparatuses capable of controlling output of power supplied to a load, the method including:
controlling, by each of the plurality of power generation apparatuses when a total output of power generated by connecting the plurality of power generation apparatuses exceeds a power consumption of the load, to adjust output of power generated by the power generation apparatus based on at least one of information indicating a power generation efficiency and information indicating a degree of degradation of each of the plurality of power generation apparatuses.

Advantageous Effect

According to this disclosure, a power generation apparatus, a power generation system, and a power generation method that advantageously control a plurality of distributed power sources as a whole can be provided.

BRIEF DESCRIPTION OF THE DRAWINGS

In the accompanying drawings.

FIG. 3 illustrates an example of a reference table according to Embodiment 1 of this disclosure;

FIG. 6 is a flowchart illustrating operations of a power generation apparatus according to Embodiment 2 of this disclosure; and FIG. 7 illustrates an example of a reference table according to Embodiment 2 of this disclosure.

DETAILED DESCRIPTION

Embodiment 1

The following describes Embodiment 1 of this disclosure with reference to the drawings.

Figure 1:
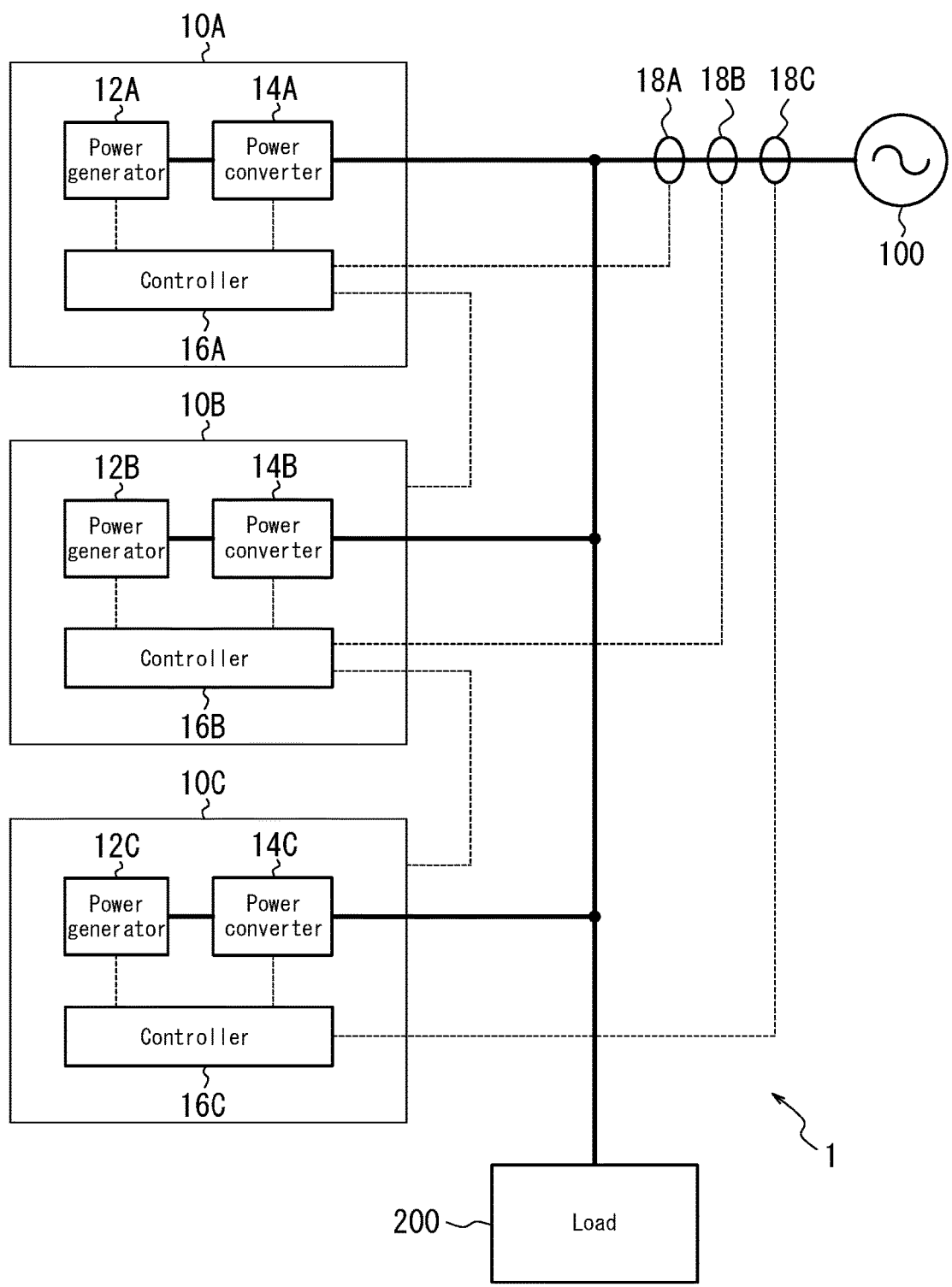
FIG. 1 is a functional block diagram schematically illustrating a power generation system that includes power generation apparatuses according to Embodiment 1 of this disclosure.

FIG. 1 is a functional block diagram schematically illustrating a power generation system that includes a plurality of power generation apparatuses according to Embodiment 1 of this disclosure.

As illustrated in FIG. 1, a power generation system 1 that includes power generation apparatuses according to Embodiment 1 of this disclosure is configured to include a power generation apparatus 10A, a power generation apparatus 10B, and a power generation apparatus 10C. FIG. 1 illustrates an example in which the power generation system 1 includes three power generation apparatuses as distributed power sources, namely power generation apparatuses 10A to 10C. The power generation system 1 according to this embodiment, however, may be configured to include any number, greater than one, of power generation apparatuses with a configuration like that of the power generation apparatuses 10A to 10C. Hereinafter, an explanation of elements and functional parts that are well known is simplified or omitted as appropriate.

As illustrated in FIG. 1, the power generation apparatus 10A includes a power generator 12A, a power converter 14A, and a controller 16A. In FIG. 1, bold lines indicate the path of power, whereas dashed lines indicate the path of control signals or signals that communicate a variety of information.

The power generator 12A is connected to a grid 100 and generates power to supply to a load 200. The grid 100 may be a general, commercial power grid. The power generator 12A may, for example, be configured by any of a variety of fuel cells or the like, such as a Polymer Electrolyte Fuel Cell (PEFC) or Solid Oxide Fuel Cell (PEFC). In particular, in this embodiment, the power generator 12A preferably cannot sell generated power to the grid, i.e. preferably generates power that cannot be subjected to reverse power flow.

The "power that cannot be subjected to reverse power flow" is power that is based on energy supplied from infrastructure, such as power generated by a fuel cell, and that is not allowed to be sold, for example as is the case currently in Japan. Accordingly, in this embodiment, the power generator 12A is preferably a different power generator from a power generator that can sell generated power to the grid, an example of which is a power generator provided with a solar cell that generates solar power. The following describes an example of the power generator 12A being an SOFC. The power generator according to this disclosure is not, however, limited to being an SOFC and may typically be any of a variety of power generators provided with a fuel cell. In particular, the power generator 12A is preferably a distributed power source that is incapable of reverse power flow.

The power generator 12A constituted by a SOFC generates power with a fuel cell power generation apparatus that causes gas, such as hydrogen and oxygen, supplied from the outside to undergo an electrochemical reaction. In this embodiment, the power generator 12A may be capable of independent operation, whereby at startup time, the power generator 12A starts to operate upon receiving power from the grid 100 but then operates without receiving power from the grid 100 after starting up. In this embodiment, the power generator 12A may include other functional parts as necessary, such as a reformer, in order to allow independent operation. In this embodiment, the power generator 12A can be configured by a typical, widely known fuel cell, and therefore a more detailed description of the fuel cell is omitted.

The power generated by the power generator 12A can be supplied through the power converter 14A to a variety of loads 200 that consume power. In an actual house or the like, the power output from the power generation apparatus 10A is supplied to the load 200 after passing through a distribution board or the like, but such a member is omitted here. The load 200 may be any of a variety of devices to which power is supplied from the power generation system 1, such as household appliances used by the user. In FIG. 1, the load 200 is illustrated as one member, but the load 200 is not limited to being one member and may be any number of devices.

The power converter 14A converts the power generated by the power generator 12A from DC to AC. In greater detail, the power converter 14A first raises or lowers the voltage of the DC power generated by the power generator 12A with a DC/DC converter and then converts the power to AC power with a DC/AC inverter. The power converter 14A may be configured using a typical inverter and may have a typical, widely-known structure. Hence, details are omitted.

The controller 16A controls and manages the power generation apparatus 10A overall, starting with the functional parts of the power generation apparatus 10A. The controller 16A may, for example, be configured by a microcomputer, a processor (CPU), or the like. The controller 16A is described below as being provided with a memory that stores a variety of programs and a variety of information. This memory also stores algorithms, a variety of reference tables such as lookup tables (LUT), and the like that are used for data analysis, various calculations, and the like performed by the controller 16A. In particular, in this embodiment, the controller 16A controls the output of power generated by the power generator 12A. In order to perform such control, the controller 16A for example can control power generation of the power generator 12A and control output of the power converter 14A. Therefore, as illustrated in FIG. 1, the controller 16A is connected by control lines to the power generator 12A and the power converter 14A. The following mainly focuses on operations of the controller 16A and the like pertaining to control that is unique to this embodiment.

The power generation apparatus 10B includes a power generator 12B that is connected to the grid 100 and generates power to supply to the load 200, a power converter 14B that converts the power generated by the power generator 12B from DC to AC, and a controller 16B that controls the output of power generated by the power generator 12B. The power generation apparatus 10C includes a power generator 12C that is connected to the grid 100 and generates power to supply to the load 200, a power converter 14C that converts the power generated by the power generator 12C from DC to AC, and a controller 16C that controls the output of power generated by the power generator 12C.

As illustrated in FIG. 1, the power generation apparatuses 10A, 10B, and 10C may all have nearly the same structure, but this example is not limiting. Instead, these apparatuses may have different structures. In this embodiment, it suffices for the power generation apparatuses 10A, 10B, and 10C to be connected to the grid 100 and to be capable of controlling output of power supplied to the load 200. In other words, the power generation system 1 is configured to include a plurality of power generation apparatuses 10A, 10B, and 10C that can connect to the grid 100 and control the output of power supplied to the load 200.

Furthermore, as illustrated in FIG. 1, in the power generation system 1, the power generation apparatus 10A is connected to the other power generation apparatuses 10B and 10C. In this way, the power generation apparatus 10A, power generation apparatus 10B, and power generation apparatus 10C can each be configured by a distributed power source. In FIG. 1, the DC power generated by the power generators 12A to 12C is connected after conversion to AC power, but the power generation system 1 according to this embodiment is not limited to this configuration, and the power may be connected while still in the form of DC power.

Furthermore, as illustrated in FIG. 1, in the power generation system 1, the power generation apparatuses 10A to 10C are connected to corresponding current sensors 18A to 18O. The current sensors 18A to 18O may, for example, be Current Transformers (CT). Any element that can detect current, however, may be used.

The current sensors 18A to 18C can detect when the power output by the power generation system 1 is flowing in reverse to the grid 100. Therefore, as illustrated in FIG. 1, the current sensors 18A to 18C are disposed at a position to detect the portion of the power output by the power generation apparatuses 10A to 10C that flows to the grid 100 after being supplied to the load 200. The controllers 16A to 160 are notified directly or indirectly of the current detected by the current sensors 18A to 18C by wired or wireless communication. The controller 16A can calculate the reverse flow power from the current detected by the current sensors 18A to 180.

In the power generation system 1 according to this embodiment, as illustrated in FIG. 1, the power generation apparatuses 10A and 10B are connected, and the power generation apparatuses 10B and 10C are connected. In greater detail, the controllers 16A and 16B are preferably connected, and the controllers 16B and 16C are preferably connected, but connection is not limited to this configuration. The power generation apparatuses may be connected in any way that allows them to communicate. Furthermore, such connection may be wired or wireless. By being connected in this way, the power generation apparatuses 10A to 10C can exchange and share a variety of information.

Next, operations of the power generation apparatuses 10A to 10C in the power generation system 1 according to this embodiment are described.

When the power generation system 1 according to this embodiment begins to operate, one of the plurality of power generation apparatuses (for example 10A to 10C) may be selected and may perform control as a main apparatus (master). In this case, among the plurality of power generation apparatuses (for example 10A to 10C), the apparatuses not selected as the main apparatus (master) preferably perform control as subordinate apparatuses (slaves). As one example, the following describes the case of the power generation apparatus 10A being the main apparatus (master) and controlling operation of the other power generation apparatuses 10B and 10C that are subordinate apparatuses (slaves).

In this embodiment, when reverse power flow occurs, the operating status of each power generation apparatus is determined taking into consideration the degree of degradation of each power generation apparatus. In other words, among the power generation apparatuses, a power generation apparatus with a high degree of degradation is caused not to operate insofar as possible, whereas a power generation apparatus with a low degree of degradation is caused to operate insofar as possible.

In order to implement such control, the power generation apparatuses 10A to 10C included in the power generation system 1 share information indicating the degree of degradation of each apparatus. The power generation apparatuses 10A to 10C also share a reference table that prescribes the output of each power generation apparatus to achieve the output required of the power generation system 1 as a whole. This information and table may be stored in each of the controllers 16A to 16C in the power generation apparatuses 10A to 10C.

The "information indicating the degree of degradation" of the power generation apparatuses 10A to 10C (hereinafter abbreviated as "degradation information") may be a variety of types of information. The "degradation information" is further described below.

For example, in the power generators 12A to 12C, there are various driving components, such as pumps and fans, and various components that constitute the fuel cell power generation module, internal-combustion engine and other functional parts. These components have different degrees of degradation due to various factors, such as the temperature when the power generation apparatuses 10A to 10C are each used; the number of revolutions of moving components, such as fans; the generated power, operating time, and power generation efficiency of the power generation apparatuses 10A to 10C; and the like. The degree of degradation of each these components affects the lifespan of the power generation apparatuses 10A to 10C.

Therefore, in this embodiment, each of the controllers 16A to 16C measures a characteristic parameter related to degradation of a predetermined component constituting the power generation apparatuses 10A to 10C, the state of the component, the operating time of the component, and the like. Based on these measurements, the controllers 16A to 16C infer the overall degree of degradation and store the result as the "degradation information". This degradation information is shared with the other power generation apparatuses by communication between the power generation apparatuses 10A to 10C.

Furthermore, the power generation apparatus 10A that is the main apparatus (master) creates the below-described reference table and transmits the reference table to the other power generation apparatuses (in this case, the power generation apparatuses 10B and 10C).

The above-described degradation information is information that changes over time. Therefore, the power generation apparatuses 10A to 10C preferably share the latest degradation information insofar as possible. Accordingly, in this embodiment, for example at predetermined time intervals, information indicating the degree of degradation of the power generation apparatuses 10A to 10C is preferably collected, and the above-described reference table is preferably updated. Below, processing to collect information and the like indicating the degree of degradation of the power generation apparatuses 10A to 10C and to update the reference table is described.

Figure 2:
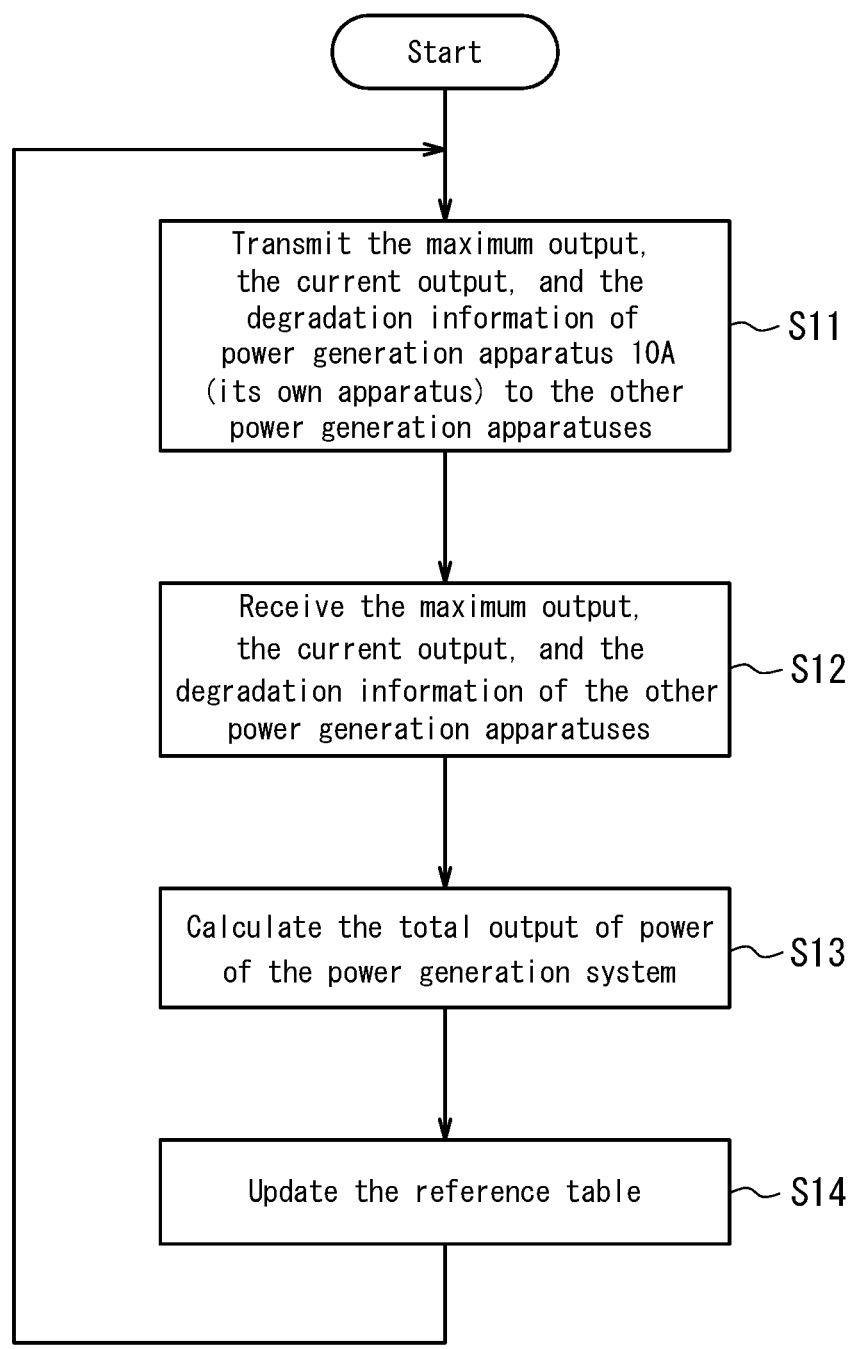
FIG. 2 is a flowchart illustrating operations of a power generation apparatus according to Embodiment 1 of this disclosure.

FIG. 2 is a flowchart illustrating processing to update the reference table in the power generation apparatuses 10A to 10C according to an embodiment of this disclosure.

As illustrated in FIG. 2, upon the start of the processing by the power generation apparatus 10A to update the reference table, the controller 16A transmits a variety of information on the power generation apparatus 10A to the other power generation apparatuses 10B and 10C (step S11). In greater detail, in step S11, the controller 16A transmits (1) the maximum output of power that can be generated by the power generation apparatus 10A, (2) the output of power currently being generated by the power generation apparatus 10A, and (3) the degradation information of the power generation apparatus 10A. In order to execute the processing in step S11, the controller 16A performs control to acquire the aforementioned various information in advance, for example at predetermined time intervals.

Here, (1) the maximum output of power that can be generated by the power generation apparatus 10A is the output of maximum power that can be generated by the power generation apparatus 10A, for example the rated power of the power generation apparatus 10A. (2) The output of power currently being generated by the power generation apparatus 10A is the value of the power being output currently by the power generation apparatus 10A. (3) The degradation information of the power generation apparatus 10A may, for example, be the above-described information indicating the state of a component constituting the power generation apparatuses 10A to 10C or information indicating the operating time of a component constituting the power generation apparatuses 10A to 10C. In particular, in this embodiment, the degradation information is preferably information indicating the degree of degradation of a component constituting the power generation apparatuses 10A to 10C and information on degradation characteristics of a component constituting the power generation apparatuses 10A to 10C.

Once the controller 16A transmits various information on its own apparatus (the power generation apparatus 10A) to the other power generation apparatuses 10B and 10C in step S11, the controller 16A receives similar information from the other power generation apparatuses 10B and 10C (step S12). In step S11, the power generation apparatus 10B transmits the above-described various information to the power generation apparatuses 10A and 10C. Also, in step S11, the power generation apparatus 10C transmits the above-described various information to the power generation apparatuses 10A and 10B. Accordingly, in step S12, the power generation apparatuses 10A to 10C can share information on the power generation apparatuses 10A to 10C included in the power generation system 1 by each receiving the above-described various information from the other power generation apparatuses.

Once the power generation apparatus 10A receives the various information from the other power generation apparatuses 10B and 10C in step S12, the controller 16A calculates the current total output of power generated in the power generation system 1 (step S13). In step S13, the controller 16A acquires the output of power currently being generated by the power generation apparatuses 10A to 10C and therefore can calculate the current total output of power generated by the power generation system 1 from these pieces of information.

Upon calculating the current total output of power generated by the power generation system 1 in step S13, the controller 16A updates the reference table based on the various received information (step S14). When updating the reference table, the controller 16A determines the operating status of each of the power generation apparatuses 10A to 10C taking into consideration the degree of degradation thereof. The controller 16A stores the reference table updated in this way in the memory. In step S14, the power generation apparatuses 10A to 10C can each store the updated reference table. At this time, the controllers 16A to 160 of the power generation apparatuses 10A to 10C may each execute processing to update the reference table, or the power generation apparatus 10A may transmit the updated reference table to the power generation apparatuses 10B and 10C.

FIG. 3 illustrates an example of the reference table updated in step S14.

In step S14, based on the degradation information of the power generation apparatuses 10A and 10C and the maximum output of power that they can generate, the controller 16A prescribes the power to be output by each of the power generation apparatuses 10A to 10C when the power generation system 1 outputs a predetermined power, as illustrated in FIG. 3. As an example in FIG. 3, the maximum output of each of the power generation apparatuses 10A to 10C is assumed to be 3 kW. Also, as an example in FIG. 3, the degree of degradation of the power generation apparatus 10A is assumed to be lowest, and the degree of degradation of the power generation apparatus 10C is assumed to be highest. Furthermore, as an example in FIG. 3, degradation is assumed to progress slowly when the power generation apparatuses 10A to 10C operate at an output of up to 2.0 kW and to progress more rapidly during operation at an output of 2.0 kW or more.

In FIG. 3, the power x [kW] output by the power generation system 1 as a whole is shown in the left column, and the power to be output by each of the power generation apparatuses 10A to 10C at this time is shown in table form. Since the degree of degradation of the power generation apparatus 10A is lowest, the priority for operating the power generation apparatus 10A is increased when the power generation system 1 is running. Conversely, since the degree of degradation of the power generation apparatus 10C is highest, the priority for operating the power generation apparatus 10C is lowered when the power generation system 1 is running. By referring to such a reference table, the controllers 16A to 16C can learn the power that the power generation apparatuses 10A to 10C should each output when the power generation system 1 outputs power x [kW].

Next, in accordance with the updated reference table illustrated in FIG. 3, operations by the power generation apparatuses 10A to 10C are described.

In the power generation system 1 illustrated in FIG. 1, when the demand for power consumption by the load 200 is greater than the maximum output of the power generation apparatuses 10A to 10C, power is purchased from the grid 100. At this time, the current sensors 18A to 18C respectively provided in the power generation apparatuses 10A to 10C detect the current of forward power flow. Upon the current sensors 18A to 18C thus detecting the current of forward power flow, the controllers 16A to 16C control the power generation apparatuses 10A to 10C each to output maximum power. The portion of the demand for power consumption by the load 200 that is not met by output of the power generation system 1 is then covered by purchasing power from the grid 100.

On the other hand, when the maximum power output by the power generation apparatuses 10A to 10C in the power generation system 1 is greater than the demand for power consumption by the load 200, the current sensors 18A to 18C respectively provided in the power generation apparatuses 10A to 10C detect the current of reverse power flow. In this case, the power generation apparatuses 10A to 10C perform the control according to this embodiment as described below.

In this embodiment, when current of reverse power flow occurs, the power output by the power generation apparatuses 10A to 10C is reduced in accordance with the current detected by the current sensors 18A to 18C, and the total output of power of the power generation system 1 is set to be equal to or less than the demand for power consumption by the load 200. At this time, the power output by the power generation apparatuses 10A to 10C is set to follow the reference table described with reference to FIG. 3.

Figure 4:
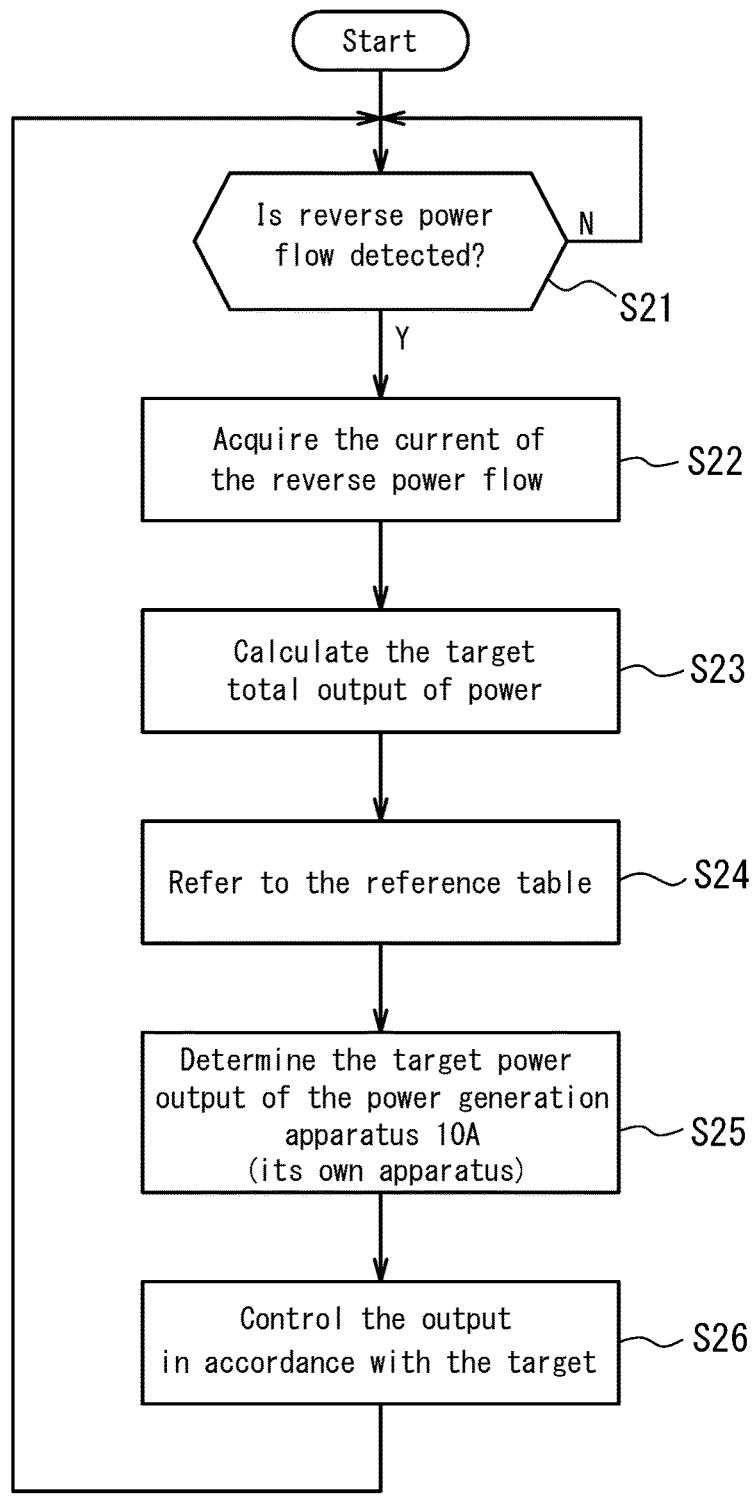
FIG. 4 is a flowchart illustrating operations of a power generation apparatus according to Embodiment 1 of this disclosure.

FIG. 4 is a flowchart illustrating the processing for the power generation apparatuses 10A to 10C to determine a target output and to control the output. As one example, the following describes processing executed by the power generation apparatus 10A, but the power generation apparatuses 10B and 10C can also execute similar processing.

Upon the start of the processing in FIG. 4, the controller 16A of the power generation apparatus 10A determines whether the current sensor 18A has detected the current of reverse power flow (step S21). Upon reverse power flow being detected in step S21, the controller 16A acquires the current of the reverse power flow detected by the current sensor 18A (step S22).

After acquiring the current of the reverse power flow in step S22, the controller 16A calculates the target total output of power by the power generation system 1 based on the acquired current of the reverse power flow and the total output of power generated by the power generation system 1 calculated in step S13 (step S23). In order to prevent the reverse flow of current due to power generation by the fuel cell from occurring for longer than a predetermined time, the target total output of power calculated in step S23 is smaller than the total power that can be output by the power generation apparatuses 10A to 10C.

Once the target total output of power is calculated in step S23, the controller 16A refers to the reference table (such as the one in FIG. 3) stored in the memory (step S24). As a result, when the power generation system 1 as a whole outputs power to meet the target, the power generation apparatuses 10A to 10C can learn what power they should each output. In this way, by referring to the reference table in step S24, the controller 16A determines the target power for its own apparatus, the power generation apparatus 10A, to output (step S25).

Once the target power to output is determined in step S25, the controller 16A controls the power generator 12A and/or the power converter 14A so that the output of the power generation apparatus 10A becomes the target power (step S26). In this way, by the controllers 16A to 160 each performing control, the total power output by the power generation apparatuses 10A to 10C becomes the total output of power that is the target for the power generation system 1.

In this way, when the total output of power generated by the power generation apparatuses 10A to 10C exceeds the power consumption of the load 200, the controller 16A performs control to adjust the output of power generated by the power generation apparatuses 10A to 10C based on information indicating the degree of degradation of the power generation apparatuses 10A to 10C.

At this time, based on information indicating the degree of degradation of the power generation apparatuses 10A to 10C, the controller 16A may perform control to adjust the output of generated power on a priority basis starting with whichever one of the power generation apparatuses 10A to 10C has a higher value for the degree of degradation. Also at this time, based on information indicating the degree of degradation of the power generation apparatuses 10A to 10C, the controller 16A may perform control to adjust the output of generated power on a priority basis starting with whichever one of the power generation apparatuses 10A to 10C has a lower value for the degree of degradation. In this embodiment, "to adjust" the output of generated power may refer to a variety of forms, such as increasing, decreasing, suppressing, or maintaining the power.

In the controller 16A, the "information indicating the degree of degradation" of the power generation apparatuses 10A to 10C may be information indicating the status of components constituting the power generation apparatuses 10A to 10C. The "information indicating the degree of degradation" may also be information indicating the operating time of components constituting the power generation apparatuses 10A to 10C.

As described above, in this embodiment, the distributed power source with a low degree of degradation is caused to operate prior to the other distributed power sources, thereby reducing the load of the distributed power source with a high degree of degradation. Therefore, the lifespan of the distributed power sources is averaged, allowing the lifespan of the power generation system as a whole to be lengthened. In recent years, consumers of power have more often been installing distributed power sources that generate low-cost electricity in their homes, so as to cover their power consumption on their own. Considering the cost of introducing distributed power sources, even a slight increase in the lifespan of distributed power sources is preferable. Therefore, according to this disclosure, the lifespan of expensive distributed power sources can be extended, offering an economic advantage.

Embodiment 2

The following describes Embodiment 2 of this disclosure.

A power generation system that includes power generation apparatuses according to Embodiment 2 can be implemented with a similar structure to that of the power generation system 1 according to Embodiment 1 described with reference to FIG. 1. In Embodiment 2, the control by the controllers 16A to 160 is changed. Accordingly, the below-described power generation system according to Embodiment 2 has the same structure as that of the power generation system 1, and a detailed description of the structure is omitted. In this embodiment, an explanation of content that is similar to Embodiment 1 is simplified or omitted as appropriate.

In this embodiment, when reverse power flow occurs, the operating status of each power generation apparatus is determined taking into consideration the power generation efficiency of each power generation apparatus. In other words, among the power generation apparatuses, a power generation apparatus with low power generation efficiency is caused not to operate insofar as possible, whereas a power generation apparatus with high power generation efficiency is caused to operate insofar as possible.

In order to implement such control, the power generation apparatuses 10A to 10C included in the power generation system 1 share information indicating the power generation efficiency of each apparatus. The power generation apparatuses 10A to 10C also share a reference table that prescribes the output of each power generation apparatus to achieve the output required of the power generation system 1 as a whole. This information and table may be stored in each of the controllers 16A to 16C in the power generation apparatuses 10A to 10C.

The "information indicating the power generation efficiency" of the power generation apparatuses 10A to 10C (hereinafter abbreviated as "efficiency information") may be a variety of types of information. The "efficiency information" is further described below.

For example, in the power generators 12A to 12C, there are various driving components, such as pumps and fans, and various components that constitute the fuel cell power generation module, internal-combustion engine and other functional parts. These components are elements that determine the power generation efficiency characteristics of the power generation apparatuses and affect the power generation efficiency of the power generation apparatuses 10A to 10C. In particular, in a power generation apparatus such as a fuel cell, the power generation efficiency changes depending on factors such as the output of generated power and the operating temperature during power generation.

In this embodiment, the controllers 16A to 16C detect the output of power generated by the power generation apparatuses 10A to 10C, the operating temperature during power generation, and the like. Based on these detected pieces of information, the controllers 16A to 16C calculate the power generation efficiency of each of the power generation apparatuses 10A to 10C and store the result as "efficiency information". This efficiency information is shared with the other power generation apparatuses by communication between the power generation apparatuses 10A to 10C. Furthermore, the power generation apparatus 10A that is the main apparatus (master) creates the below-described reference table and transmits the reference table to the other power generation apparatuses (in this case, the power generation apparatuses 10B and 10C).

Figure 5A:
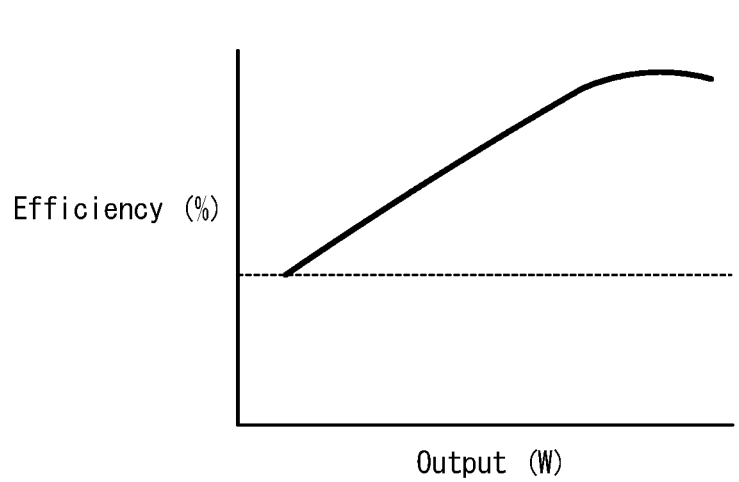
FIGS. 5A, 5B, and 5C illustrate examples of the power generation efficiency of a power generation apparatus according to Embodiment 2 of this disclosure.
Figure 5B:
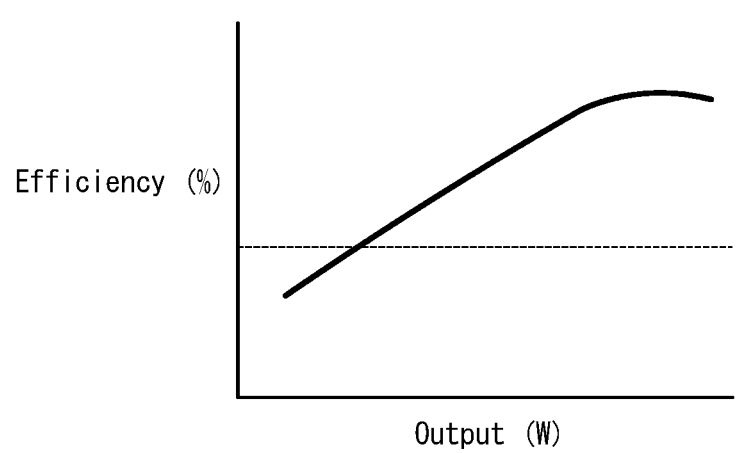
Figure 5C:
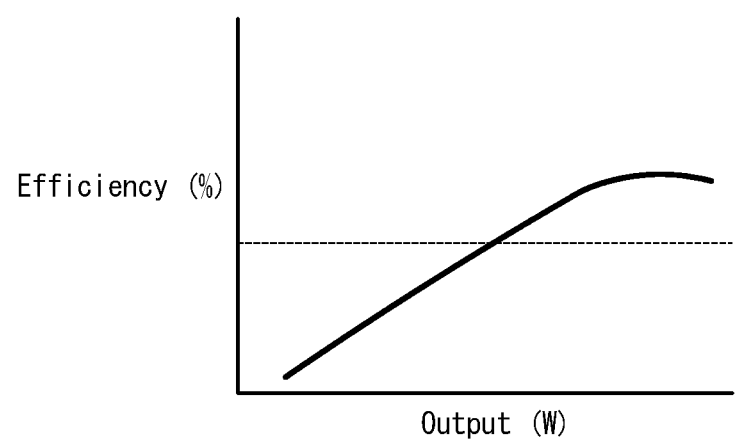

FIGS. 5A, 5B, and 5C illustrate examples of the efficiency characteristics of the power generation apparatuses 10A to 10C. FIG. 5A illustrates an example of the efficiency characteristics of the power generation apparatus 10A, FIG. 5B illustrates an example of the efficiency characteristics of the power generation apparatus 10B, and FIG. 5C illustrates an example of the efficiency characteristics of the power generation apparatus 10C.

As illustrated in FIGS. 5A to 5C, the power generation apparatuses 10A to 10C have characteristics such that the efficiency increases roughly in proportion to the output power. In FIGS. 5A to 5C, a reference line is indicated with a dashed line to allow comparison of the power generation efficiency between the power generation apparatuses 10A to 10C. As illustrated in FIGS. 5A to 5C, the rated efficiency of the power generation apparatus 10A is the highest, with the rated efficiency then decreasing in the order of the power generation apparatus 10B and the power generation apparatus 10C.

As described above, the power generation efficiency of the power generation apparatuses 10A to 10C can change for example depending on the output of power generated by the power generators 12A to 12C, the operating temperature during power generation by the power generators 12A to 12C, and other such factors. Hence, the efficiency information is also information that can change over time. Therefore, the power generation apparatuses 10A to 10C preferably share the latest efficiency information insofar as possible. Accordingly, in this embodiment, for example at predetermined time intervals, information indicating the power generation efficiency of the power generation apparatuses 10A to 10C is preferably collected, and the above-described reference table is preferably updated. Below, processing to collect information and the like indicating the power generation efficiency of the power generation apparatuses 10A to 10C and to update the reference table is described.

FIG. 6 is a flowchart illustrating processing to update the reference table in the power generation apparatuses 10A to 10C according to an embodiment of this disclosure.

As illustrated in FIG. 6, upon the start of the processing by the power generation apparatus 10A to update the reference table, the controller 16A transmits a variety of information on the power generation apparatus 10A to the other power generation apparatuses 10B and 10C (step S31). In greater detail, in step S31, the controller 16A transmits (1) the maximum output of power that can be generated by the power generation apparatus 10A, (2) the output of power currently being generated by the power generation apparatus 10A, and (3) the efficiency information of the power generation apparatus 10A. In order to execute the processing in step S11, the controller 16A performs control to acquire the aforementioned various information in advance, for example at predetermined time intervals.

As described above, (3) the efficiency information of the power generation apparatus 10A for example may be information calculated based on the output of power generated by the power generation apparatuses 10A to 10C, the operating temperature during power generation, and the like.

Once the controller 16A transmits various information on its own apparatus (the power generation apparatus 10A) to the other power generation apparatuses 10B and 10C in step S31, the controller 16A receives similar information from the other power generation apparatuses 10B and 10C (step S32). In step S31, the power generation apparatus 10B transmits the above-described various information to the power generation apparatuses 10A and 10C. Also, in step S31, the power generation apparatus 10C transmits the above-described various information to the power generation apparatuses 10A and 10B. Accordingly, in step S32, the power generation apparatuses 10A to 10C can share information on the power generation apparatuses 10A to 10C included in the power generation system 1 by each receiving the above-described various information from the other power generation apparatuses.

Once the power generation apparatus 10A receives the various information from the other power generation apparatuses 10B and 10C in step S32, the controller 16A calculates the current total output of power generated in the power generation system 1 (step S33). In step S33, the controller 16A acquires the output of power currently being generated by the power generation apparatuses 10A to 10C and therefore can calculate the current total output of power generated by the power generation system 1 from these pieces of information.

Upon calculating the current total output of power generated by the power generation system 1 in step S33, the controller 16A updates the reference table based on the various received information (step S34). When updating the reference table, the controller 16A determines the operating status of each of the power generation apparatuses 10A to 10C taking into consideration the power generation efficiency thereof. The controller 16A stores the reference table updated in this way in the memory. In step S34, the power generation apparatuses 10A to 10C can each store the updated reference table. At this time, the controllers 16A to 16C of the power generation apparatuses 10A to 10C may each execute processing to update the reference table, or the power generation apparatus 10A may transmit the updated reference table to the power generation apparatuses 10B and 10C.

FIG. 7 illustrates an example of the reference table updated in step S34.

In step S34, based on the efficiency information of the power generation apparatuses 10A and 10C and the maximum output of power that they can generate, the controller 16A prescribes the power to be output by each of the power generation apparatuses 10A to 10C when the power generation system 1 outputs a predetermined power, as illustrated in FIG. 7. As an example in FIG. 7, the maximum output of each of the power generation apparatuses 10A to 10C is assumed to be 3 kW. Also, as an example in FIG. 7, the power generation efficiency of the power generation apparatus 10A is assumed to be highest, and the power generation efficiency of the power generation apparatus 10C is assumed to be lowest.

In FIG. 7, the power x [kW] output by the power generation system 1 as a whole is shown in the left column, and the power to be output by each of the power generation apparatuses 10A to 10C at this time is shown in table form. Since the power generation efficiency of the power generation apparatus 10A is highest, the priority for operating the power generation apparatus 10A is increased when the power generation system 1 is running. Conversely, since the power generation efficiency of the power generation apparatus 10C is lowest, the priority for operating the power generation apparatus 10C is lowered when the power generation system 1 is running. By referring to such a reference table, the controllers 16A to 16C can learn the power that the power generation apparatuses 10A to 10C should each output when the power generation system 1 outputs power x [kW].

In accordance with the updated reference table as in FIG. 7, the power generation apparatuses 10A to 10C can operate in nearly the same way as in Embodiment 1, as described with reference to FIG. 4. In other words, in this embodiment, processing for the power generation apparatuses 10A to 10C to determine a target output and to control the output can be executed in accordance with the flowchart described with reference to FIG. 4. In FIG. 4, processing executed by the power generation apparatus 10A was described as an example, but the power generation apparatuses 10B and 10C can also execute similar processing.

In this embodiment as well, when current of reverse power flow occurs, the power output by the power generation apparatuses 10A to 10C is reduced in accordance with the current detected by the current sensors 18A to 18C, and the total output of power of the power generation system 1 is set to be equal to or less than the demand for power consumption by the load 200. At this time, in Embodiment 2, the power output by the power generation apparatuses 10A to 10C is set to follow the reference table described with reference to FIG. 7.

In this embodiment, once the target total output of power is calculated in step S23 described with reference to FIG. 4, the controller 16A refers to the reference table (such as the one in FIG. 7) stored in the memory (step S24). As a result, when the power generation system 1 as a whole outputs power to meet the target, the power generation apparatuses 10A to 10C can learn what power they should each output. In this way, by referring to the reference table in step S24, the controller 16A determines the target power for its own apparatus, the power generation apparatus 10A, to output (step S25).

In this way, when the total output of power generated by the power generation apparatuses 10A to 10C exceeds the power consumption of the load 200, the controller 16A performs control to adjust the output of power generated by the power generation apparatuses 10A to 10C based on information indicating the power generation efficiency of the power generation apparatuses 10A to 10C.

At this time, based on information indicating the power generation efficiency of the power generation apparatuses 10A to 10C, the controller 16A may perform control to adjust the output of generated power on a priority basis starting with whichever one of the power generation apparatuses 10A to 10C has a lower value for the power generation efficiency. Also at this time, based on information indicating the power generation efficiency of the power generation apparatuses 10A to 10C, the controller 16A may perform control to adjust the output of generated power on a priority basis starting with whichever one of the power generation apparatuses 10A to 10C has a higher value for the power generation efficiency. In this embodiment, "to adjust" the output of generated power may refer to a variety of forms, such as increasing, decreasing, suppressing, or maintaining the power. Also, in this embodiment, when the power generators 12A to 12C of the power generation apparatuses 10A to 10C are for example configured by fuel cells, such as an SOFC, the "power generation efficiency" may be the efficiency when converting the gas supplied to the fuel cell to electricity.

In the controller 16A, the "information indicating the power generation efficiency" of the power generation apparatuses 10A to 10C may be information indicating the power generated by the power generation apparatuses 10A to 10C. This "information indicating the power generation efficiency" may also be information indicating the operating temperature during power generation by the power generation apparatuses 10A to 10C.

As described above, in this embodiment, the distributed power source with high power generation efficiency is caused to operate prior to the other distributed power sources, and operation of the distributed power source with low power generation efficiency is suppressed. In other words, in this embodiment, the output of the distributed power sources is controlled so that the efficiency of the power generation system 1 as a whole increases. Therefore, in this embodiment, the amount of fuel input into the power generation system 1 as a whole can be reduced. In particular, in the case of a distributed power source such as a fuel cell or an engine, if there is variation in the efficiency of a plurality of distributed power sources, the amount of fuel required to obtain the same output increases, driving up the running cost. Therefore, according to this embodiment, the running cost can be reduced, offering an economic advantage.

Although this disclosure is based on the accompanying drawings and examples, it is to be noted that various changes and modifications will be apparent to those skilled in the art based on this disclosure. Therefore, such changes and modifications are to be understood as included within the scope of this disclosure. For example, the functions and the like included in the various functional parts, means, and steps may be reordered in any logically consistent way. Furthermore, functional parts or steps may be combined into one or divided. The above embodiments of this disclosure are not limited to being implemented precisely as described and may be implemented by combining or partially omitting the features thereof.

For example, in the above-described embodiments, the controllers 16A to 16O are described as each including a memory and storing the reference table and the like. The power generation apparatuses 10A to 10C, however, may each be configured to include a memory separate from the controllers 16A to 16O.

In the power generation apparatuses 10A to 10C, instead of storing a reference table such as the one illustrated in FIG. 3 or FIG. 7 in advance, the controllers 16A to 16O may for example make a real-time calculation of the power to be output by the power generation apparatuses 10A to 10C.

After step S13 described with reference to FIG. 2 or step S33 described with reference to FIG. 6, for example the controller 16A may perform control to correct the reference table by exchanging information on the reference table with the other power generation apparatuses 10B and 10C.

In Embodiment 1, based on information related to the time until a maintenance checkup, for example for components constituting the power generation apparatuses, the controllers 16A to 16O in the power generation apparatuses 10A to 10C may cause the power generation apparatus that is facing the next maintenance checkup within a predetermined short period of time to operate at a high load prior to the other power generation apparatuses.

In Embodiment 2 above, the efficiency information is described as being the result of calculating the power generation efficiency of the power generation apparatuses 10A to 10C based on a variety of conditions. Such efficiency information may, however, be information provided in advance in the power generation apparatuses 10A to 10C rather than information that is updated dynamically.

The efficiency characteristics of the power generation apparatuses 10A to 10C illustrated in FIGS. 5A, 5B, and 5C are not limited to characteristics such as those illustrated in FIGS. 5A, 5B, and 5C. The efficiency characteristics of the power generation apparatuses 10A to 10C need not be characteristics that are roughly proportional to output. The efficiency characteristics of the power generation apparatuses 10A to 10C may also have nearly the same characteristic curve.

This disclosure may also be embodied as the power generation system 1. In this case, in Embodiment 1, when the total output of power generated by connecting the plurality of power generation apparatuses 10A to 10C exceeds the power consumption of the load 200, the plurality of power generation apparatuses 10A to 10C each perform control to adjust the output of generated power based on information indicating the degree of degradation of the plurality of power generation apparatuses 10A to 10C. In Embodiment 2, when the total output of power generated by connecting the plurality of power generation apparatuses 10A to 10C exceeds the power consumption of the load 200, the plurality of power generation apparatuses 10A to 10C each perform control to adjust the output of generated power based on information indicating the power generation efficiency of the plurality of power generation apparatuses 10A to 10C.

This disclosure may also be implemented as a power generation method by the plurality of power generation apparatuses 10A, 10B, and 10C that can connect to the grid 100 and control output of power supplied to the load 200.

For example, in Embodiment 1, this power generation method includes a control step for each of the power generation apparatuses 10A to 10C to perform control to adjust the output of generated power when the total output of power generated by connecting the plurality of power generation apparatuses 10A to 10C exceeds the power consumption of the load 200. In this control step, control is performed to adjust the output of generated power based on information indicating the degree of degradation of the plurality of power generation apparatuses 10A to 10C. This disclosure may also be embodied as a method corresponding to the power generation apparatuses 10A, 10B, and 10C, or as a method corresponding to the power generation system 1. In Embodiment 2, for example in this control step, control is performed to adjust the output of generated power based on information indicating the power generation efficiency of the plurality of power generation apparatuses 10A to 10C.

Much of the subject matter of this disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), an electronic notepad, a laptop computer, and other programmable data processing apparatuses. It should be noted that in each embodiment, a variety of operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a processor, a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The machine-readable, non-transitory storage medium used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium (such as a Compact Disc (CD), laser Disc®, Digital Versatile Disc (DVD®), Floppy® disk, and Blu-ray Disc® (laser disc, DVD, floppy, and Blu-ray disc are each a registered trademark in Japan, other countries, or both)), portable computer disk, Random Access Memory (RAM), Read-Only Memory (ROM), rewritable programmable ROM such as EPROM, EEPROM, or flash memory, another tangible storage medium that can store information, or a combination of any of these. The memory may be provided internal and/or external to a processor/processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

1 Power generation system
10A, 10B, 10C Power generation apparatus
12A, 12B, 12C Power generator
14A, 14B, 14C Power converter
16A, 16B, 16C Controller
18A, 18B, 18C Current sensor
100 Grid
200 Load

The invention claimed is:

1. A power generation apparatus comprising:
a power generator configured to generate power to supply to a load; and
a controller configured to control output of power generated by the power generator;
wherein the controller controls, when a total output of power generated by the power generation apparatus and another power generation apparatus connected to the power generation apparatus exceeds a power consumption of the load, to adjust output of power generated by the power generation apparatus and by the other power generation apparatus based on at least one of information indicating a power generation efficiency and information indicating a degree of degradation of the power generation apparatus and the other power generation apparatus, and
wherein the controller controls to adjust output of generated power on a priority basis starting with whichever one of the power generation apparatus and the other power generation apparatus has a lower value for the power generation efficiency, or
wherein the controller controls to adjust output of generated power on a priority basis starting with whichever one of the power generation apparatus and the other power generation apparatus has a higher value for the power generation efficiency.

2. The power generation apparatus of claim 1, wherein the controller controls to adjust output of generated power on a priority basis starting with whichever one of the power generation apparatus and the other power generation apparatus has a higher value for the degree of degradation.

3. The power generation apparatus of claim 1, wherein the controller controls to adjust output of power generated by the power generation apparatus and by the other power generation apparatus based on information indicating a state of a component constituting the power generation apparatus and the other power generation apparatus as the information indicating the degree of degradation.

4. The power generation apparatus of claim 1, wherein the controller controls to adjust output of power generated by the power generation apparatus and by the other power generation apparatus based on information indicating an operating time of a component constituting the power generation apparatus and the other power generation apparatus as the information indicating the degree of degradation.

5. The power generation apparatus of claim 1, wherein the controller controls to adjust output of power generated by the power generation apparatus and by the other power generation apparatus based on information indicating an operating temperature during power generation by the power generation apparatus and the other power generation apparatus as the information indicating the power generation efficiency.

6. A power generation system comprising:
a plurality of power generation apparatuses capable of controlling output of power supplied to a load;
wherein each of the plurality of power generation apparatuses comprises a controller that control, when a total output of power generated by connecting the plurality of power generation apparatuses exceeds a power consumption of the load, to adjust output of generated power based on at least one of information indicating a power generation efficiency and information indicating a degree of degradation of each of the plurality of power generation apparatuses, and
wherein the controller controls to adjust output of generated power on a priority basis starting with whichever one of the plurality of power generation apparatuses has a lower value for the power generation efficiency, or
wherein the controller controls to adjust output of generated power on a priority basis starting with whichever one of the plurality of power generation apparatuses has a higher value for the power generation efficiency.

7. A power generation method for a plurality of power generation apparatuses capable of controlling output of power supplied to a load, the method comprising:
controlling, by each of the plurality of power generation apparatuses when a total output of power generated by connecting the plurality of power generation apparatuses exceeds a power consumption of the load, to adjust output of generated power based on at least one of information indicating a power generation efficiency and information indicating a degree of degradation of each of the plurality of power generation apparatuses, and
controlling, based on information indicating the power generation efficiency, to adjust output of generated power on a priority basis starting with whichever one of the plurality of power generation apparatuses has a lower value for the power generation efficiency, or
controlling, based on information indicating the power generation efficiency, to adjust output of generated power on a priority basis starting with whichever one of the plurality of power generation apparatuses has a higher value for the power generation efficiency.

8. The power generation method of claim 7, wherein in the step of controlling, control is performed to adjust output of generated power on a priority basis starting with whichever one of the power generation apparatus and the other power generation apparatus has a higher value for the degree of degradation.

9. The power generation method of claim 7, wherein in the step of controlling, control is performed to adjust output of power generated by the power generation apparatus and by the other power generation apparatus based on information indicating a state of a component constituting the power generation apparatus and the other power generation apparatus as the information indicating the degree of degradation.

10. The power generation method of claim 7, wherein in the step of controlling, control is performed to adjust output of power generated by the power generation apparatus and by the other power generation apparatus based on information indicating an operating time of a component constituting the power generation apparatus and the other power generation apparatus as the information indicating the degree of degradation.

11. The power generation method of claim 7, wherein in the step of controlling, control is performed to adjust output of generated power based on information indicating an operating temperature during power generation by the plurality of power generation apparatuses as the information indicating the power generation efficiency.

* * * * *